United States Patent [19]

Shirasaki

[11] 3,864,707
[45] Feb. 4, 1975

[54] INTERCHANGEABLE LENS WITH A STOP PRESET DEVICE

[75] Inventor: Takayuki Shirasaki, Yokohama, Japan

[73] Assignee: Canon Kabushiki Kaisha, Tokyo, Japan

[22] Filed: Aug. 27, 1973

[21] Appl. No.: 391,853

[30] Foreign Application Priority Data
Sept. 6, 1972  Japan.............................. 47-89217

[52] U.S. Cl.................... 354/271, 354/46, 354/272
[51] Int. Cl. ............................................ G03b 9/07
[58] Field of Search ...... 95/64 B, 64 D, 64 R, 10 C; 354/46, 47, 228, 229, 230, 231, 232, 270, 354/271, 272, 273, 274

[56] References Cited
UNITED STATES PATENTS

| | | | |
|---|---|---|---|
| 3,590,714 | 7/1971 | Schops............................... | 95/44 R |
| 3,646,871 | 3/1972 | Ramet................................. | 95/64 B |
| 3,695,752 | 10/1972 | Nozawa............................... | 95/64 R |
| 3,699,868 | 10/1972 | Shimomura......................... | 95/64 R |
| 3,742,829 | 7/1973 | Johansson........................... | 95/64 B |
| 3,744,393 | 7/1973 | Uchiyama et al................... | 95/64 B |

Primary Examiner—John M. Horan
Assistant Examiner—Alan Mathews
Attorney, Agent, or Firm—Flynn & Frishauf

[57] ABSTRACT

An interchangeable lens is provided with a stop preset device wherein a preset operating member in its manual stop operating region controls a preset control member and the preset operating member in its automatic aperture operating region does not perform such control but the preset control member is controlled in response to an exposure meter. The lens has means for blocking movement of the preset operating member from one of the operating regions to the other, and means for releasing the blocking means.

2 Claims, 3 Drawing Figures

INTERCHANGEABLE LENS WITH A STOP PRESET DEVICE

BACKGROUND OF THE INVENTION

1. Field of the Invention

This invention relates to an improvement in the stop preset device of an interchangeable lens usable in commom with cameras having a manual preset stop device and cameras having an automatic preset stop device (EE mechanism) interlocking with an exposure meter.

2. Description of the Prior Art

In the interchangeable lens of the described type, a stop preset operating member has a manual stop operating region and an automatic stop operating region. In the manual stop operating region, the preset operating member controls an stop control member through manual setting to preset the stop. In the automatic stop operating region, the preset operating member does not perform such control but the stop control member is controlled in response to the exposure meter in a camera to thereby preset the stop automatically.

If such an interchangeable lens were mounted to a camera having an EE mechanism, any movement of the preset operating member to the manual aperture operating region during automatic preset aperture operation or any movement of the preset operating member to the automatic aperture operating region during manual preset aperture operation would result in a wrong exposure.

SUMMARY OF THE INVENTION

It is an object of the present invention to provide an interchangeable lens provided with a stop preset device which can prevent occurrence of such malfunctioning as described above.

To achieve such an object, the interchangeable lens according to the present invention includes means for limiting the movement of the operating member to the range within each of the operating regions thereof, and means for releasing the limit means to change over the operating member from one of the operating regions to the other. The interchangeable lens may further include means for setting the exposure meter in a camera to a position ready for photography in response to the changeover of the operating member from the manual stop operating region to the automatic stop operating region.

The invention will become more fully apparent from the following detailed description thereof taken in conjunction with the accompanying drawings.

DESCRIPTION OF THE PREFERRED EMBODIMENTS

Figure 1:
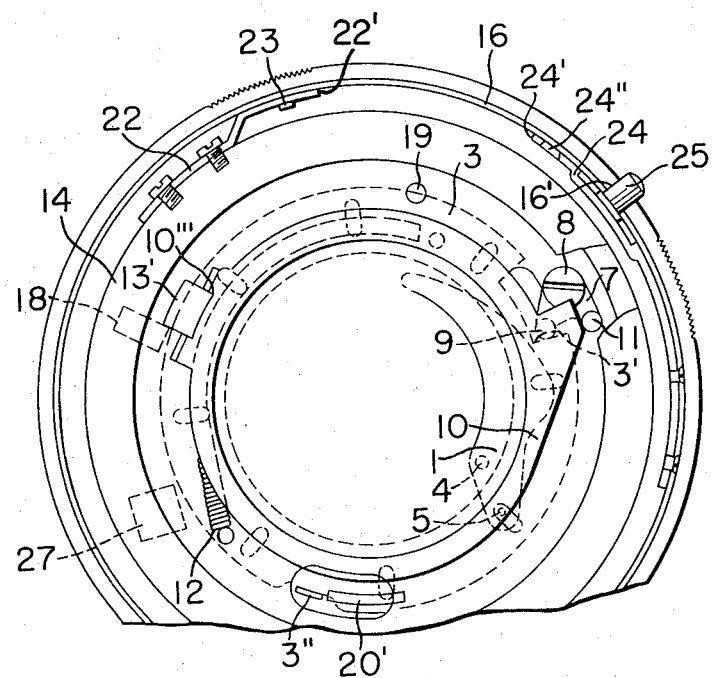
FIG. 1 is a transverse cross-sectional view of the interchangeable lens according to the present invention.
Figure 2:
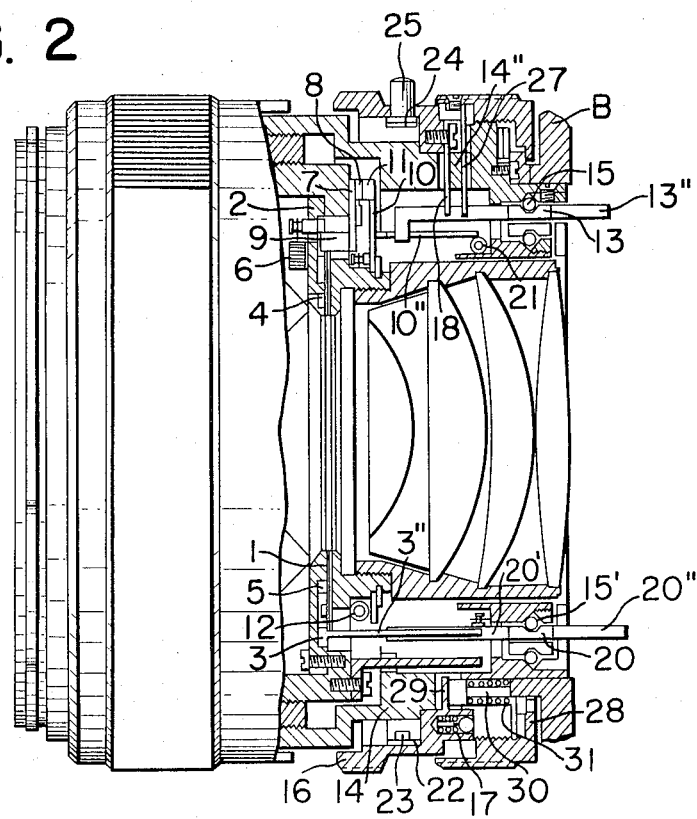
FIG. 2 is a side view, partly in section, of the same lens.

Referring to the drawings, stop blades 1 (only one of which is shown) are conventionally held between a fixed blade support ring 2 and a blade drive ring 3 by means of pins 4 and 5. The drive ring 3 is biased by a drive spring 6 in a direction for closing the stop blades and is also engaged with a stop-down lever 20 which is biased by a strong spring to normally maintain the stop blades in fully open position. A bell crank lever 7 is pivotally mounted on a lens barrel by means of a pivot 8. A pin 11 provided on one arm of the bell crank lever 7 is in engagement with a camming surface of a cam ring 10 and a pin 9 provided on the other arm of the lever 7 acts as a stopper for a cut-away portion 3' formed in the drive ring 3. The cam ring 10 has a rearwardly extending arm 10'' formed with a slot 10''', in which is engaged an arm 13' forming a part of a stop signal member 13 pivotally supported on a stationary lens barrel portion 14 by means of ball bearing. The member 13 is in engagement with an arm 18 fixedly secured to a stop preset operating ring 16 and the cam ring 10 is biased by a spring 12 in a direction for providing a slight stop-down (counter-clockwise direction in FIG. 1), so that rotation of the preset operating ring 16 causes the cam ring 10 and bell crank lever 7 to follow such rotation due to the action of the spring 12 to thereby preset the stop.

A stop-down lever 20 is pivotally supported on the stationary lens barrel portion 14 by means of ball bearing and is in engagement with the arm 3'' of the blade drive ring 3, and has a rearwardly extending arm 20' engageable with a camera's diaphragm actuating lever (not shown). Actuation of such actuating lever forces the stop-down lever 20 in counter-clockwise direction (as viewed in FIG. 1), whereupon the blade drive ring 3 is caused to rotated by the force of the spring 6 until it strikes against the pin 9 in the bell crank lever 7, thus stopping down the stop to a preset value.

Figure 3:
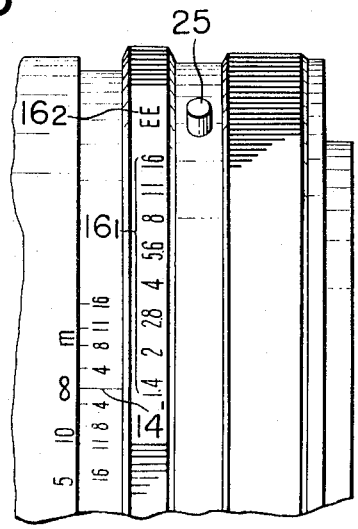
FIG. 3 is a partly cut-away side view of the smae lens.

The preset operating ring 16, as is shown in FIG. 3, has a manual preset stop scale $16_1$ and an automatic preset stop scale $16_2$ (EE system) provided on the outer periphery thereof, and also has a click stop means 17 for stopping the ring 16 at any desired one of the manual scale divisions against the force of the spring 12. Further, the preset ring 16 has a clamp spring 24 provided in the inner periphery thereof, and a push button 25 is securely mounted on such spring and extends outwardly through an opening formed in the ring 16. A limit plate 22 is fixed to the stationary lens barrel portion at a location thereof corresponding to the spring 24.

An arm 27 is provided in a bayonet ring 28 to restrain the signal member 13 in a predetermined position when the interchangeable lens is not mounted to the camera. When the interchangeable lens is mounted to the camera by registering the bayonet ring 28 with a predetermined point on the camera body B and then rotating it, the arm 27 may release the signal member 13 to permit the latter to precisely engage a member interlocking with the exposure meter in the camera.

With such lens mounted to a camera of the manual preset type, if the preset ring 16 is rotated against the click stop within a manual stop range, i.e., the range between divisions "1.4" and "16" in FIG. 3, then the cam ring 16 will be rotated to a position corresponding to a desired stop scale division through the action of the arm 18 and signal member 13 as described above, to thereby preset the stop, and at the same time the arm 13'' of the signal member 13 will transmit such preset stop value to the exposure meter in the camera, whereby a proper exposure may be determined by a follower needle system, a zero-point system or the like.

Where the same lens has been mounted to a camera having an automatic stop (EE) mechanism, the preset ring 16 should be changed over to the EE mode. In this case, when the preset ring 16 is rotated from the fully open aperture stop position shown in FIG. 3 to the minimum aperture stop position (division "16" in FIG. 3), the end 24' of the clamp spring 24 will strike against the end 22' of the limit plate 22 to stop the movement. Then, the button 25 is depressed, whereby the clamp spring 24 will flex to cause floating of the end thereof, which in turn will further rotate the ring 16 to a further position in the EE scale until the pin 23 studded in the limit plate is received in a hole 24" formed in the clamp spring 24, whereupon the button 25 may be released to fix the preset ring 16 at a desired division in the EE scale.

With the An of the preset ring, the cam ring 10 is rotatable to a position corresponding to the minimum aperture stop and stopped at such position by a limit pin 19 formed in the stationary lens barrel portion 14, while the preset ring 16 still continues its rotation until it is clamped as described previously, whereupon the engagement between the arm 18 and the signal member 13' is released to make the cam ring 10 entirely unaffected by the preset ring.

At the same time, a cam 29 provided at the rear end of the preset ring 16 forces a pin 30 against a spring 31 to cause the tip end of the pin 30 to protrude beyond the rear end surface of the lens barrel so as to actuate a switch of the exposure meter, thus making the camera ready for EE photography. If the camera is then positioned to look toward an object to be photographed, the exposure meter needle will deviate to a position corresponding to the brightness of the object. Depression of a shutter release button will cause a meter needle scanning member to scan and detect the position of the meter needle, whereupon a member interlocking therewith will force the signal member 13" clockwise, as viewed in FIG. 1, to thereby rotate the cam ring 10 to a position corresponding to the deviation of the meter needle, thus presetting the stop automatically. Continued depression of the shutter release button will cause operation of a camera's diaphragm actuating lever in response to upward movement of a mirror or the like, whereby such lever actuates the stop-down lever 20' to stop down the stop to the preset value, just in the same manner as in the case of manual presetting.

I claim:

1. An interchangeable lens for a camera provided with a stop preset device, comprising:
   a variable aperture stop;
   a cam member for presetting said stop;
   a member for automatic stop presetting, said member being engageable with said cam member;
   a manually operating member having a manual stop presetting position range, wherein said cam member is adjusted by said manually operating member, and an automatic stop presetting position wherein said cam member is freed from said manually operating member and is caused to be subject to adjustment through said automatic stop presetting member, by an exposure meter provided in the camera;
   means for limiting said operating member to positions within the manual stop presetting position range, and
   means for releasing said operating member from the limiting means and permitting the operating member to be shifted to the automatic stop presetting position.

2. An interchangeable lens according to claim 1, further comprising means for switching the exposure meter to a position for automatic stop control, in response to the shifting of said operating member from the manual stop presetting position range to the automatic stop presetting position.

* * * * *